United States Patent [19]
Lin et al.

[11] Patent Number: 6,163,802
[45] Date of Patent: *Dec. 19, 2000

[54] MESSAGE TRACKING SYSTEM

[75] Inventors: Ken K Lin, West Chester; Michael S. Lees, Coatesville; Gordon E. Hegfield, Royersford; Bruce G. Ernst, Lansdale, all of Pa.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,855

[22] Filed: Apr. 4, 1997

[51] Int. Cl.$^7$ ...................................................... G06F 15/16
[52] U.S. Cl. .......................................... 709/217; 709/200
[58] Field of Search ............................ 395/200.3, 200.47; 709/200, 217

[56] References Cited

U.S. PATENT DOCUMENTS

| | | | |
|---|---|---|---|
| 5,245,532 | 9/1993 | Mourier | 364/400 |
| 5,487,100 | 1/1996 | Kane | 379/57 |
| 5,764,898 | 6/1998 | Tsuji et al. | 709/206 |
| 5,790,790 | 8/1998 | Smith et al. | 395/200.36 |
| 5,842,185 | 11/1998 | Chancey et al. | 705/40 |
| 5,848,248 | 12/1998 | Kawasaki et al. | 395/200.68 |
| 5,860,068 | 1/1999 | Cook | 705/26 |
| 5,862,321 | 1/1999 | Lamming et al. | 395/200.3 |
| 5,892,909 | 4/1999 | Grasso et al. | 709/201 |
| 5,937,162 | 8/1999 | Funk et al. | 709/206 |
| 5,956,521 | 9/1999 | Wang | 710/35 |

OTHER PUBLICATIONS

Electronic Messaging Association, "Messaging Management Implementor's Guide: Monitoring And Message Tracking," Jan. 1997, Version 1.1.

Frenkel, G., "Pumping For Information: Notes And Database Integration," *Network Computing*, May 1, 1996, p. 76.

Gambon, J., "Lotus Links Domino With Enterprise Apps," *Information Week*, Jan. 27, 1997, No. 615, p. 24.

Girishankar, S., "IBM Hosts Taking Notes To Next Level," *Communications Week*, Nov. 4, 1996, No. 636, p. 1.

Gruener, J., "MCSB's Load Balancing Software Aids Dell Servers," *PC Week*, Mar. 3, 1997, p. 22.

Izarek, S., "Dragonfly SMTP/MIME Switch Takes Off," *Computer Shopper*, Feb., 1997, vol. 17, No. 02, p. 640.

Peterson, E., "Easing Backbone Strain," *PC Week*, Mar. 3, 1997, p. 96.

Picarille, L., "Java Apps Serve Up Flexibility," *Computerworld*, Feb. 10, 1997, pp. 43–44.

Rooney, P., "Lotus Preps IntraView," *PC Week Online*, Sep. 9, 1996.

Rooney, P., "SoftSwitch's 'Dragonfly' To Land On Internet E–Mail," *PC Week*, Nov. 25, 1996, p. 8.

Schwartz, J., "SoftSwitch Readies Net–Based Backbone," *Communications Week*, Sep. 30, 1996, No. 631, p. 1.

Stanczak, M., "Directory–Enabled No Longer Means Directory–Specific," *PC Week*, Mar. 10, 1997, p. 77.

Sullivan, K., "Internet Traffic Bogs Down The Network," *PC Week*, Mar. 3, 1997, p. 83.

*Primary Examiner*—Saleh Najjar
*Attorney, Agent, or Firm*—Hunton & Williams

[57] ABSTRACT

An electronic messaging tracking system and method is provided that tracks messages in a single or multiprotocol messaging environment. Tracking entries are collected, stored and updated. Queries may be made regarding the status, travel path, and other criteria of any message. Queries need not include a unique identifier of the message. Users may access the message tracking system from an internal or external network.

15 Claims, 18 Drawing Sheets

MESSAGE TRACKING SYSTEM

BACKGROUND OF THE INVENTION

1. Field of the Invention

The present invention relates generally to a message tracking system and method, and more particularly relates to an electronic messaging tracking system and method that supports homogeneous and heterogeneous messaging environments and provides message tracking data to users through an internal or external network interface.

2. Description of the Background

Electronic messaging has become an important part of business, governmental, educational and personal communication. More and more often, messaging is being used for the transfer of mission critical information. For such applications, users prefer and often need to know whether a message has been delivered to the intended recipient, when the recipient received the message, the path the message has taken, the current location of the message, and other messaging information. Users and administrators also need to know if the delivery of an electronic message is being frustrated by a system error or other impeding mechanisms. A drawback of existing messaging systems is that such messaging information can only be determined if the unique identifier of the particular message is known. Typically users may know the approximate time a message was sent, the intended recipient of the message or the subject of the message, but do not know the identifier of the message. Moreover, some systems do not create a unique identifier for each message.

Another aspect of modem day messaging is the fact that users on a plurality of messaging environments can communicate with each other. However, such heterogeneous messaging capabilities complicates the tracking of messages. For example, message IDs and names of originators, recipients, and the like may be transformed along the way. This makes the tracking of messages particularly difficult and burdensome.

Another shortcoming of existing messaging systems is the failure of such systems to provide users with the ability to access a message tracking mechanism via their own computer and determine the path of an electronic message. An option that is sometimes available to users is the use of "Return Receipt," or other similar tag on an electronic message that is supposed to notify the sender of a message when the message is received. However, Return Receipt has a number of drawbacks. First, the sender typically must know ahead of time (i.e., before the message is being prepared) that acknowledgment of receipt is desired. Even if the sender makes such a determination before preparation of the message, Return Receipt often does not work when the message is sent to another messaging network. The sender is then left wondering whether the message was delivered successfully.

SUMMARY OF THE INVENTION

It is therefore an object of the present invention to overcome these and other drawbacks of the prior art.

It is another object of the invention to provide a message tracking system and method that responds to message tracking queries even if the message identifier is not supplied.

It is another object of the invention to track down the location and path history of an individual message based on general descriptive information about the message.

It is another object of the invention to provide a message tracking system that accesses and manages messaging data across multiprotocol environments.

It is another object of the invention to provide a system that tracks messages in homogeneous and heterogeneous messaging environments.

It is another object of the invention to verify that one or more message paths are operating properly.

It is another object of the invention to track the message from its entry into a messaging system until it is delivered, non-delivered, or passes outside the management sphere into another management sphere. It is another object of the invention to pass a message tracking query to the appropriate authority in the next management sphere so that the track can be continued there.

It is another object of the invention to provide a user interface that allows a user to access message tracking data. Access to such data may be controlled by configurable criteria. The user interface may be invoked via an internal or an external network.

According to one embodiment of the present invention, these and other objects of the invention are achieved by a system and method that collects a plurality of tracking entries, stores the tracking entries into a message tracker store, and updates the message tracker store at a predetermined interval. The system also responds to queries about the tracking entries in the message tracker store.

According to other aspects of the invention, the tracking entries are culled from heterogenous messaging environments and may be queried by a user on an internal or external network interface.

Other objects, advantages and embodiments of the invention are set forth in part in the description which follows, and in part will be apparent from this description or may be learned from practice of the invention.

Description of the Preferred Embodiments

A preferred embodiment of the invention includes a Message Tracker Simple Network Management Protocol (SNMP) Subagent that manages the storage and updating of tracking data and handles queries to the tracking data. The invention may also include a user interface that allows a user to access the Message Tracker SNMP Subagent through an internal or external network. Although other protocols (e.g., e-mail, database query language such as SQL, and the like) are contemplated by the present invention, SNMP is specifically described here.

Figure 1:
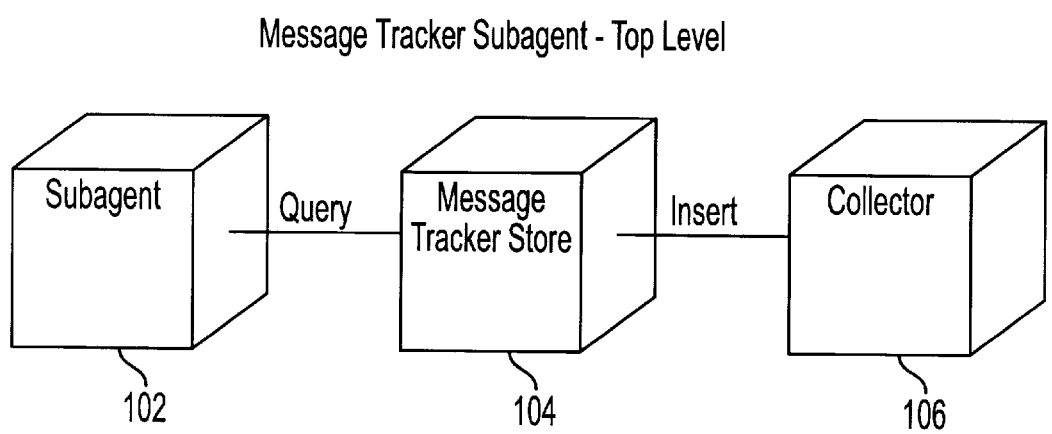
FIG. 1 illustrates the top level topology of the Message Tracker Subagent.

FIG. 1 illustrates the top level topology of the Message Tracker Subagent, which includes a Subagent 102, Message Tracker Store 104 and Collector 106. The Message Tracker Store 104 stores records of message tracking information, called MsgTrackResponseEntry records. The Subagent 102, implemented using Subagent classes (illustrated in FIG. 15) and Store classes (illustrated in FIG. 6), services Subagent message tracking queries. The Collector 106, implemented using Collector classes (illustrated in FIG. 9) and Store classes (illustrated in FIG. 6), keeps the Message Tracker Store 104 current for use by the Subagent 102.

Figure 2:
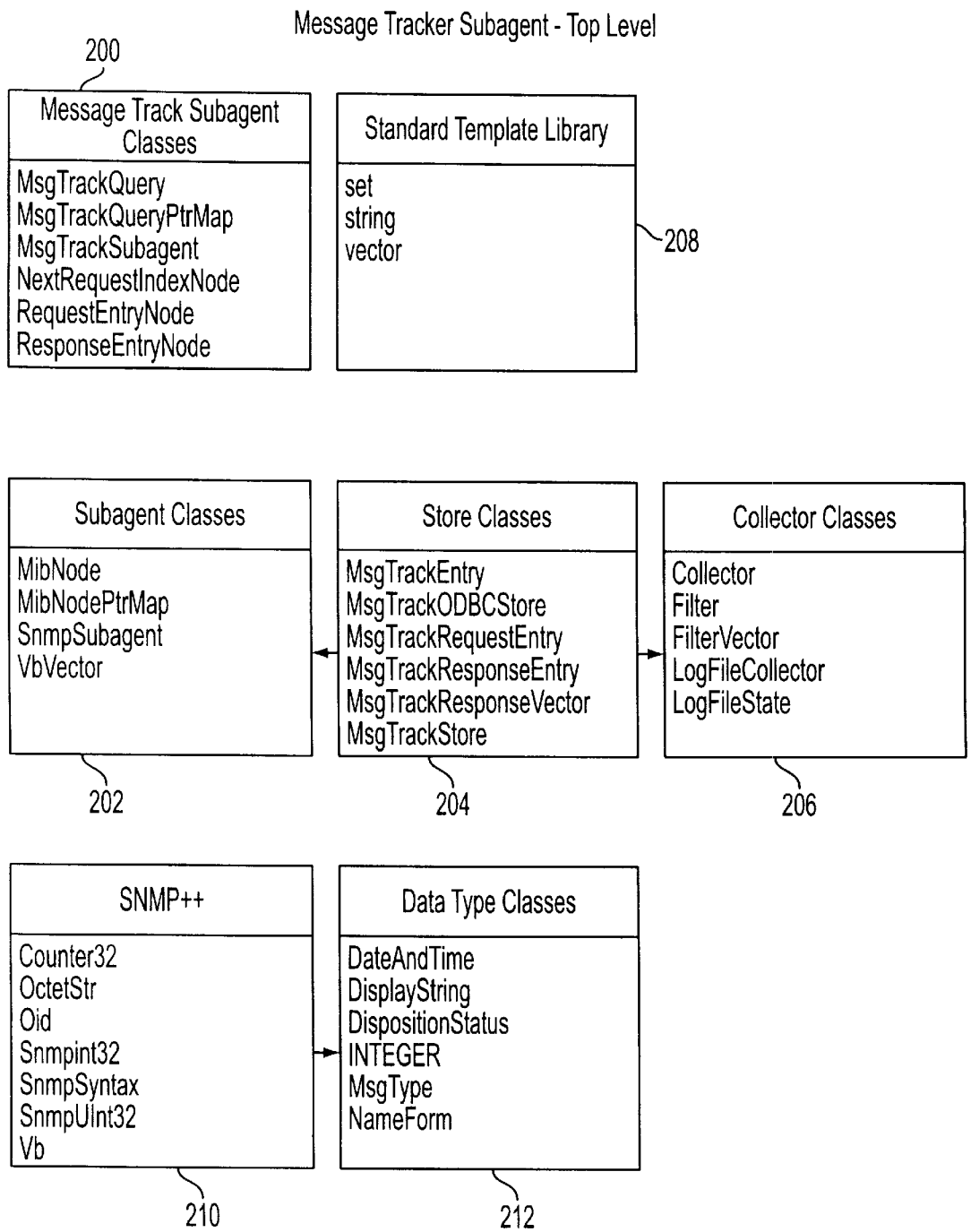
FIG. 2 is a class diagram of the top level of the Message Tracker Subagent.

FIG. 2 illustrates the primary and support classes of the Message Tracker Subagent. The primary classes include Subagent classes 200, 202, Store classes 204 and Collector classes 206. The Subagent classes 200, 202 interface with the native SNMP master agent. They service message tracking SNMP requests by performing queries against the Message Tracker Store using the Store classes 204 and reporting back the results via SNMP. The classes 204 manage the tracker store. The Collector classes 206 populate the message tracker store, while the Subagent classes query the message tracker store. The Collector classes 206 insert MsgTrackResponseEntry records from either native message log entries or a native inline mail API into the message tracker store via Store classes 204.

Figure 3:
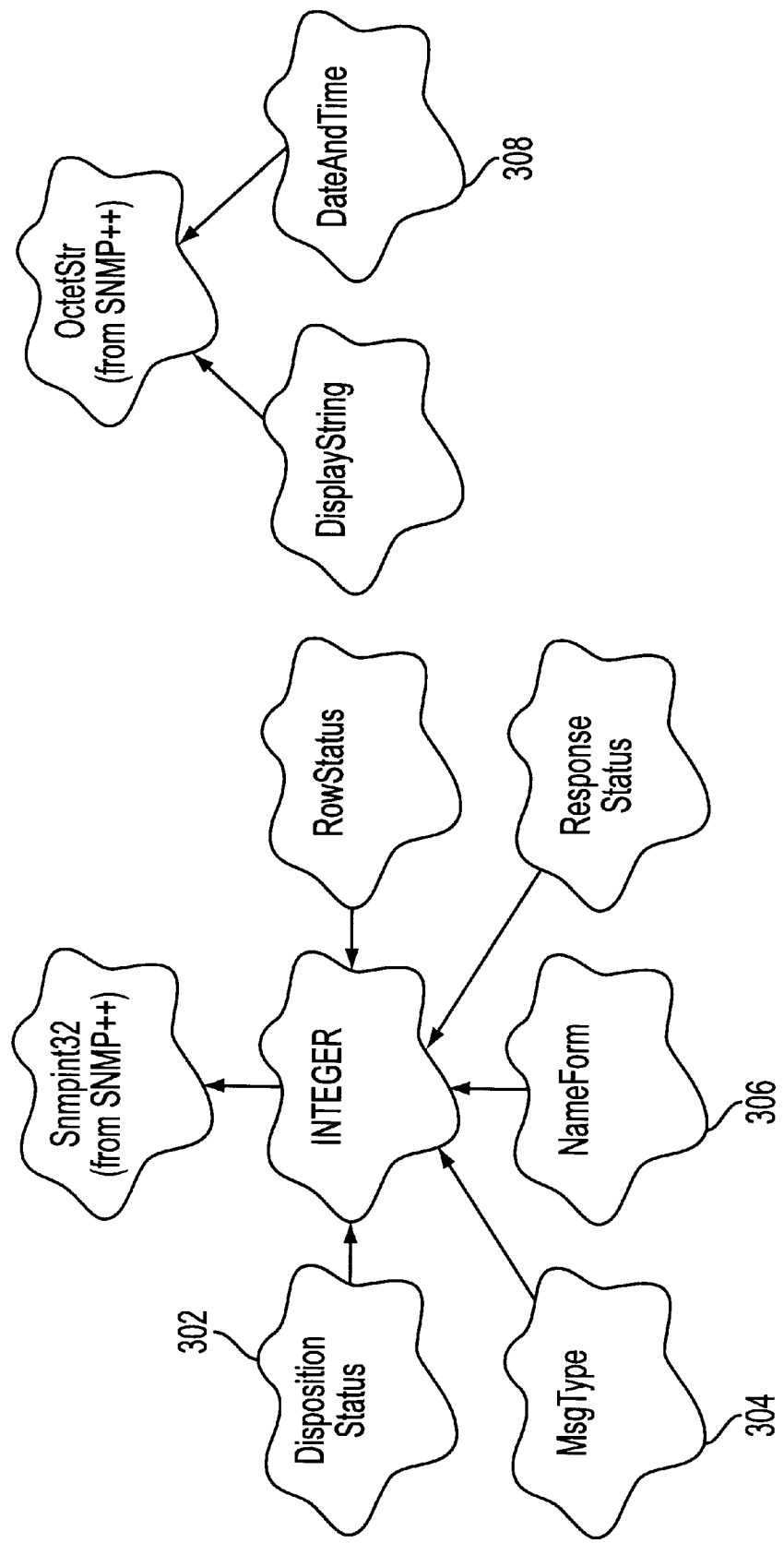
FIG. 3 is a class diagram illustrating the DataType classes of the Message Tracker Subagent.

The support classes of the Message Tracker Subagent include the Standard Template Library 208, SNMP++ 210 and Data Type classes 212. The Standard Template Library (STL) 208 is used for string, vector and set container classes. SNMP++ 210 is used for basic SNMP data classes such as Oids, SmnmpInt32, OctetStr, and the like. DataType classes 212 (illustrated in FIG. 3) are used for SNMP++ derived SNMP data classes. FIG. 3 illustrates the DataType classes, which represent various numeric (such as Disposition Status 302, MsgType 304 and NameForm 306) and textual (such as DateAndTime 308) conventions used for message tracking purposes.

Figure 4:
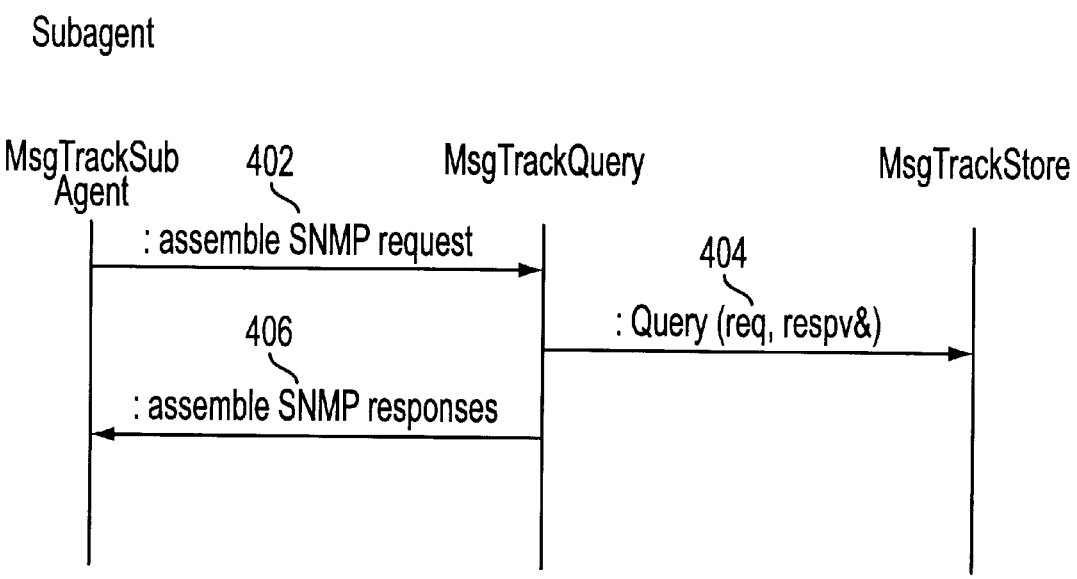
FIG. 4 is an interaction diagram illustrating the steps for operating the Subagent.

FIG. 4 illustrates the operation of the Subagent. A user generates a tracking request. The user may use general query information, such as originator of the message, recipient of the message, subject of the message, approximate time the message was sent, and the like. The request is transformed into a query fornat understood by the message tracker store. Information satisfying the query are then transformed to the appropriate fornat and returned to the user. As illustrated in the example of FIG. 4, an SNMP request is assembled 402. An SNMP message tracking request conceptual row is created from SNMP Set Programmable Data Units (PDUs) from a message tracking management application. After assembling the request row, the MsgTrackQuery object calls a MsgTrackStore object with the request transformed into a MsgTrackRequestEntry object 404. Upon returning from the Query, the supplied MsgTrackResponseVector object is filled with MsgTrackResponseEntry objects satisfying the request. The SNMP responses are then assembled 406. The MsgTrackResponseVector is stored in a conceptual row until the conceptual row is either destroyed or a time out occurs. Before the destroy, the management application can issue SNMP Get PDUs for any values in the responses.

Figure 5:
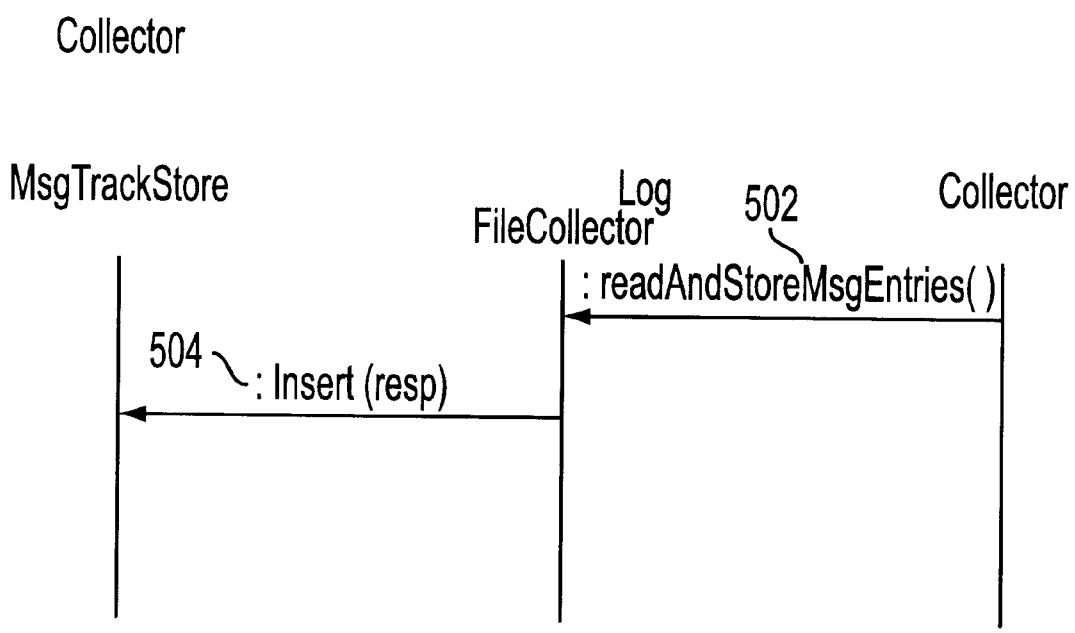
FIG. 5 is an interaction diagram illustrating the steps for operating the Collector.

FIG. 5 illustrates the operation of the Collector. At some configurable time interval, the Collector reads messaging data from native message log entries. The Collector may also read messaging data from a native inline mail API. The messaging data may encompass information from homogeneous and heterogeneous messaging environments. The Collector then inserts the data into the message tracker store. As illustrated in the example of FIG. 5, the Collector's readAndStoreMsgEntries method is called at some time interval (for example, in the case of log files-based message tracking) by the Collector 502. The MsgTrackResponseEntry objects are then inserted into the message tracker store using MsgTrackStore's Insert method 504.

Figure 6:
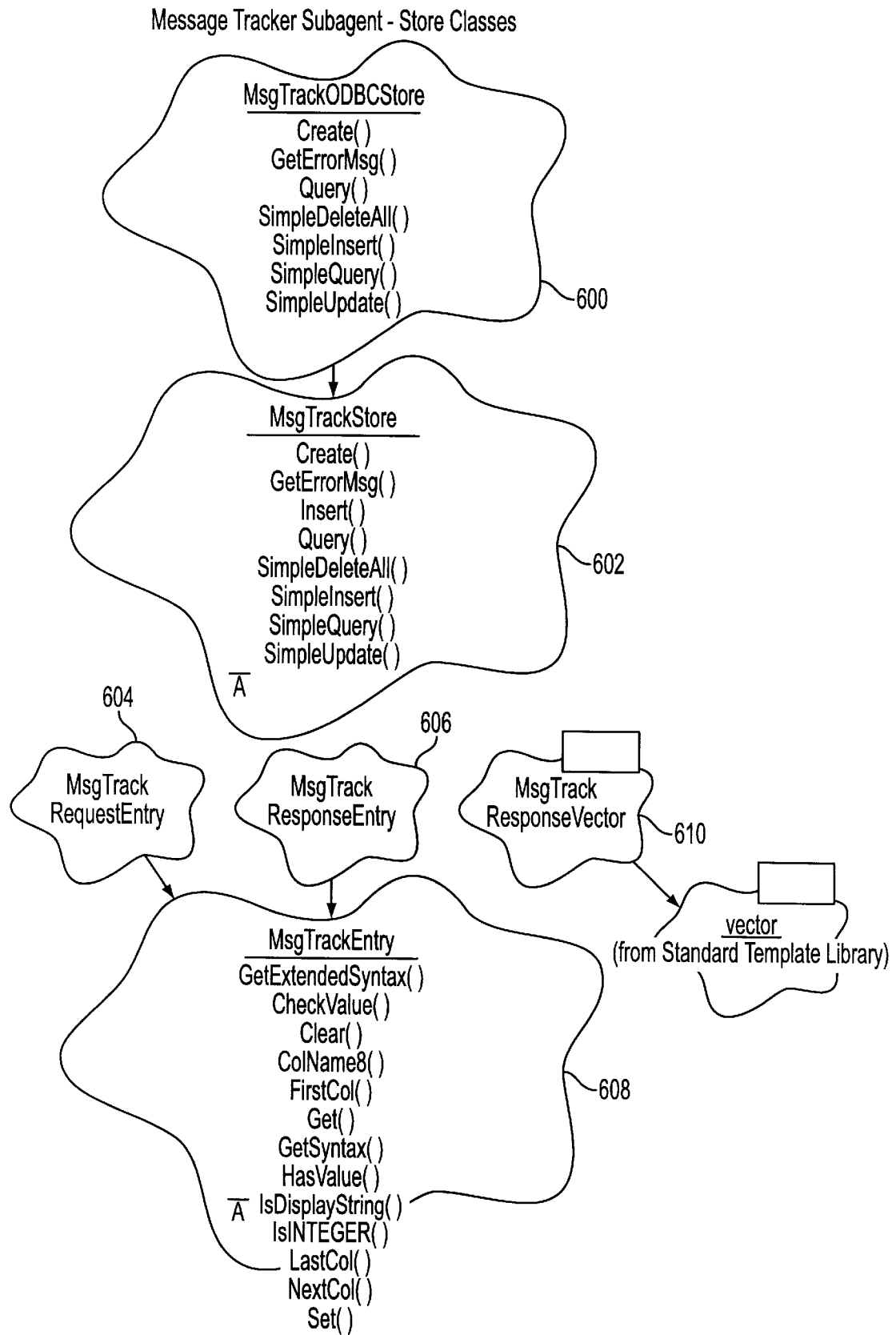
FIG. 6 is a class diagram illustrating the Store classes of the Message Tracker Subagent.

FIG. 6 illustrates the Store classes. The Store classes allow both the Subagent and Collector programs to access the message tracker store. The former fetches entries from the store while the latter inserts entries into the store. The actual implementation and format of the message tracker store itself is hidden within the Store classes. This allows for the possibility of different store implementations without affecting the code in either the Subagent or Collector programs.

The MsgTrackStore class 602 is the primary class in this category. The MsgTrackStore class 602 is used for inserting items into and retrieving (i.e., querying) items from the message track store. MsgTrackResponseEntry objects 606 are inserted using the Insert method. MsgTrackResponseEntry objects 606 are retrieved using the Query method by supplying a MsgTrackRequestEntry 604. The MsgTrackStore::Query method is used during the Subagent process by MsgTrackQuery objects to synchronously fetch MsgTrackResponseEntry objects from the message tracker store, given a MsgTrackRequestEntry object. The MsgTrackStore::Insert method is used during the Collector process by Collector objects to synchronously insert MsgTrackResponseEntry objects into the message tracker store.

The MsgTrackODBCStore class 600 is a MsgTrackStore-derived class that uses the Open Database Connectivity (ODBC) interface standard of Microsoft™ and its drivers to implement message tracker stores. The MsgTrackODBCStore class 600 is used for inserting items into and retrieving (i.e., querying) items from a message track store whose underlying access method is via an ODBC interface.

Other Store Classes may be derived from the MsgTrackStore base class to implement other message tracker stores. The classes would be used for inserting items into and retrieving (i.e., querying) items from a message track store whose underlying access method is via a particular interface.

The MsgTrackEntry 608 is the abstract base class for both MsgTrackRequestEntry 604 and MsgTrackResponseEntry 606. The MsgTrackStore class 602 uses MsgTrackEntry-derived objects as arguments for MsgTrackStore methods such as Insert and Query. These derived classes serve as containers for message tracker request and response values for a single row. The values for each column are expressed as objects from the (SnmpSyntax-derived) DataTypes class category. For example, HasValue allows the caller to detect whether a value has been assigned to a specified column. The SnmpSyntax, int, and char* variations of Get and Set allow the caller to get or set a column's value using different formats.

In addition to column values, static information about request and response columns are also provided. For example, FirstCol, NextCol, and LastCol allow callers to iterate over the columns in a row. GetSyntax, IsINTEGER, return IsDisplayString return information about a column's SNMP syntax type. ColName8 returns a table-unique string, maximum of 8 characters, representing each column.

The MsgTrackRequestEntry class 604 is derived from the abstract MsgTrackEntry class 608. It is used to contain values representing a SNMP MsgTrackRequest Entry. These values may include ResponseStatus, MaxResponses, UniqueMsgId, InboundOriginator, InboundRecipient, OutboundRecipient, RecipientNameForm, Subject, MaxMsgSize, LatestArrivalTime, DispositionStatus, FailureReason and MsgType. In addition to providing the column numbers (i.e., colEntryIndex, . . . , colFailureReason) for each of its columns, MsgTrackRequestEntry 604 supplies implementations for MsgTrackEntry's ColName8, GetSyntax, IsDisplayString, and IsINTEGER pure virtual methods.

The MsgTrackResponseEntry class 606 is derived from the abstract MsgTrackEntry class 608. It is used to contain values representing a SNMP MsgTrackResponseEntry. These values may include DispositionStatus, DispositionTime, NextHopMta, NonDeliveryReason, MsgArrivalTime, MsgSize, MsgPriority, UniqueMsgId, InboundOriginator, OutboundRecipient, SupplementalInformation, Subject and MsgType. In addition to providing the column numbers (i.e., colEntryIndex, . . . , colMsgType) for each of its columns, MsgTrackResponseEntry 606 supplies implementations for MsgTrackEntry's ColName8, GetSyntax, IsDisplayString, and IsINTEGER pure virtual methods.

The MsgTrackResponseVector class 610 is a vector of MsgTrackResponseEntry objects. It is used by MsgTrackStore::Query to return one or more MsgTrackResponse objects, representing the results of a query.

Figure 7:
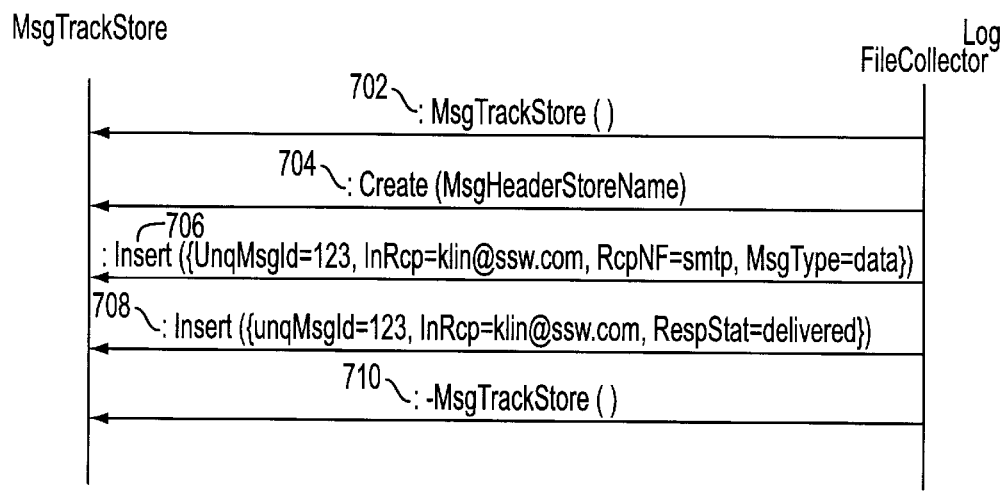
FIG. 7 is an interaction diagram illustrating the steps for inserting entries into the MsgTrackStore.

FIG. 7 illustrates the steps for inserting entries into the MsgTrackStore. First, when the Collector object is constructed, it also constructs a MsgTrackStore object 702. Next, the Collector completes the initialization of the MsgTrackStore object by calling the MsgTrackStore object's Create method, passing in the name of the message tracker store (e.g., an ODBC data source name) 704. Between the Create and ~MsgTrackStore calls, the Collector calls Insert any time there is an entry to be inserted into the message tracker store 706. In the example illustrated in FIG. 7, partial information about message 123 addressed is inserted. When additional information about the status for message 123, addressed to klin@ssw.com is received, it is also inserted 708. The MsgTrackStore object then updates the row created in step 706. When the Collector object is destroyed, the MsgTrackStore object will also be destroyed, performing any necessary cleanup 710.

Figure 8:
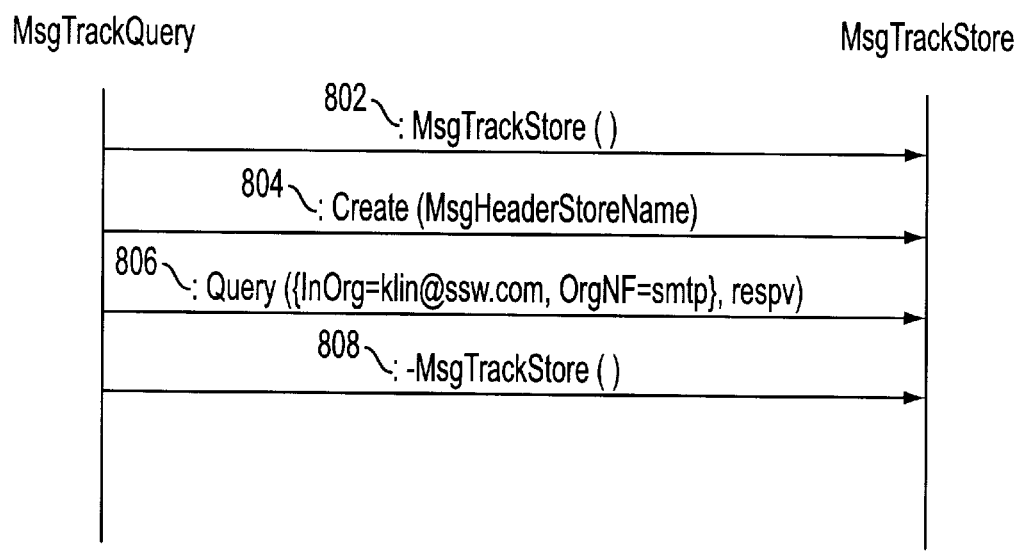
FIG. 8 is an interaction diagram illustrating the steps for querying entries in the MsgTrackStore.

FIG. 8 illustrates the steps for querying entries in MsgTrackStore. When the MsgTrackQuery object is constructed, it also constructs a MsgTrackStore object 802. The MsgTrackQuery completes the initialization of the MsgTrackStore object by calling the MsgTrackStore object's Create method, passing in the name of the message tracker store (e.g., an ODBC data source name) 804. Between the Create and ~MsgTrackStore calls, the MsgTrackQuery calls Query to service SNMP message track requests 806. When the MsgTrackQuery object is destroyed, the MsgTrackStore object will also be destroyed, performing any necessary cleanup 808.

Figure 9:
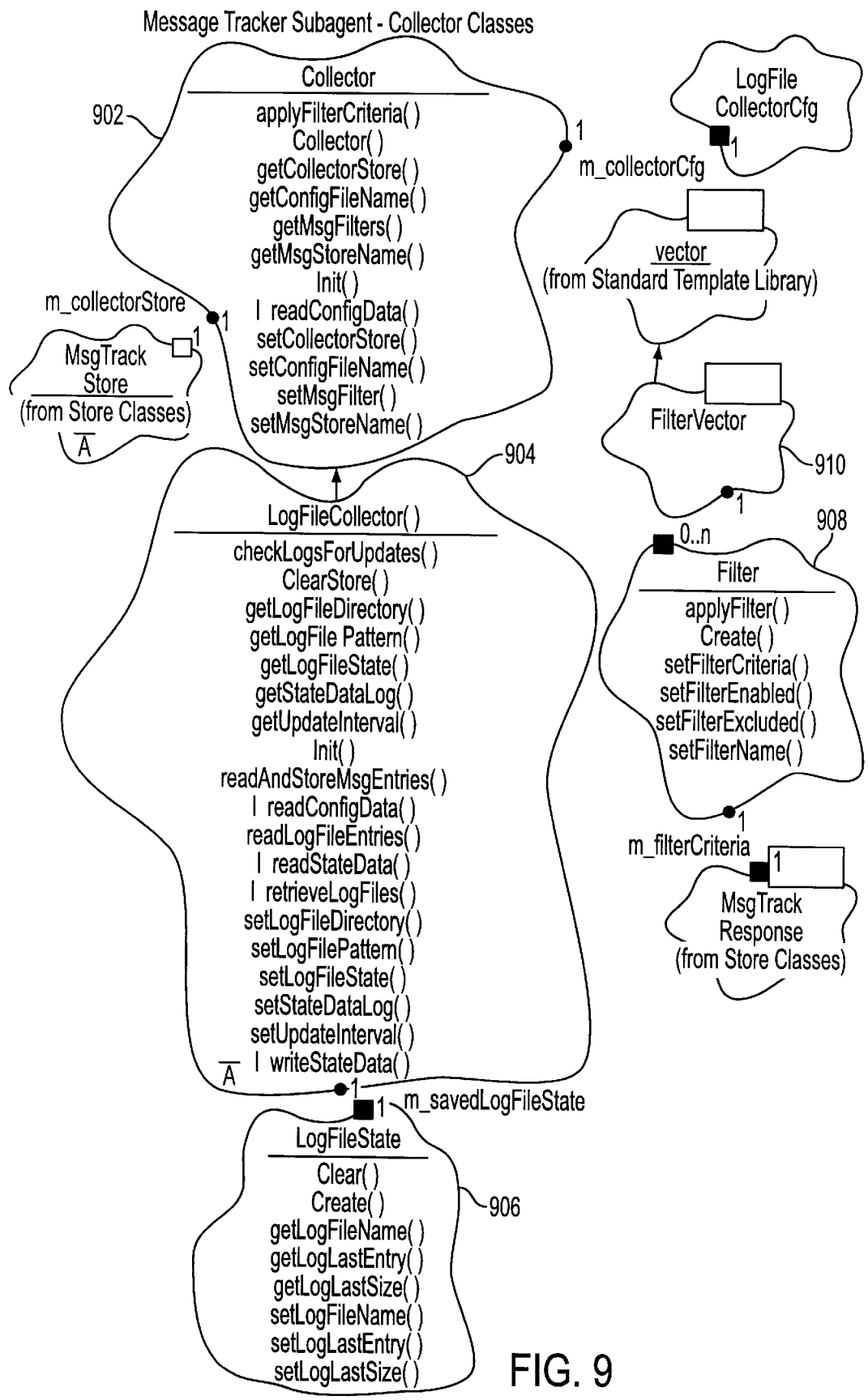
FIG. 9 is a class diagram illustrating the Collector classes of the Message Tracker Subagent.

FIG. 9 illustrates the message tracker Collector classes. The Collector classes are intended to encapsulate the common data and operations that need to be performed by the processes that convert and store native message tracking entries into the canonical message tracker store. The classes include Collector 902, LogFileCollector 904, LogFileState 906, Filter 908 and FilterVector 910.

The Collector class 902 encapsulates the data and methods needed to filter canonical message track entries and provides access to the message track store. Configurable filtering criteria are applied to canonical message tracking entries prior to their insertion into the message track store. A separate process running on the messaging server utilizes the Collector class to filter native message tracking entries collected via a messaging server specific API.

The Collector class holds a reference to a message track store object and performs any initializations required to access the store. The message track store object is then utilized to either insert or update the entries into the message track store.

The LogFileCollector class 904 is derived from the Collector class. It is an abstract class that encapsulates the data and methods needed to read and extract message track entries from messaging server specific log files, converts them into canonical message track store format, and stores them into the canonical message track store. Its extensions provide the data and methods to access the native log files. The extensions add data and methods pertinent to the configuration of a log file collector such as the native log file directory location, native log file extensions, update interval, and the like. The LogFileCollector class 904 also applies configurable filtering criteria to the canonical message entries prior to inserting them into the canonical message store. The LogFileCollector class 904 is an abstract class with one pure virtual method whose implementation is messaging server specific. This method is readLogFileEntries, which reads the native log file entries from the log file staring from the location that was last read. It then converts the entries into message track store format and filters them. It also either inserts or updates the entries into the message track store.

In addition, the LogFileCollector class contains two virtual methods: checkLogsForUpdates and retrieveLogFiles. The former checks the native log files to see if they have been updated since they were last read. The latter populates a vector of strings with a chronologically ordered list of all native log file names.

A separate process running on the messaging server utilizes a derivation of the LogFileCollector class 904 to insert native message tracking entries collected from log files into the message track store. The methods of the LogFileCollector class 904 are invoked periodically by the user to check the native log files for updates and insert new entries into the message track store. The periodicity of this check is part of the LogFileCollector configuration.

The LogFileCollector class 904 utilizes another class, LogFileState 906, to track and share state information about the last accessed native log file. The LogFileState class 906 represents state information about the native log file that is currently being accessed. The information is used to determine whether the log file has been updated or not and where in the log file the last message tracking entry was read.

The LogFileState class 906 encapsulates data used to track information about the last accessed native log file. The LogFile State class 906 contains three data members: m_logFileName, m_logLastEntry, and m_logLastModifyTime. m_logFileName contains the full path name of the native log file from which the last message tracking entry was read. m_logLastEntry contains the last native message tracking entry read from m_logFileName. m_logLastModifyTime contains the last known modification time of m_logFileName at the point it was determined that m_logFileName contained new native message tracking entries.

The Filter class 908 contains filtering data and methods to apply to canonical message store entries prior to adding them to the canonical message track store. For example, the message tracking entries may be filtered according to criteria configured to address the preferences or needs of administrators or other entities, based on system requirements, corporate policy, user preferences and the like. The Filter class 908 is utilized by the Collector 902 and LogFileCollector 904 classes. The FilterVector class 910 is an instantiation of the C++ standard template library (STL) vector class and is used to hold a series of Filter type objects.

Figure 10:
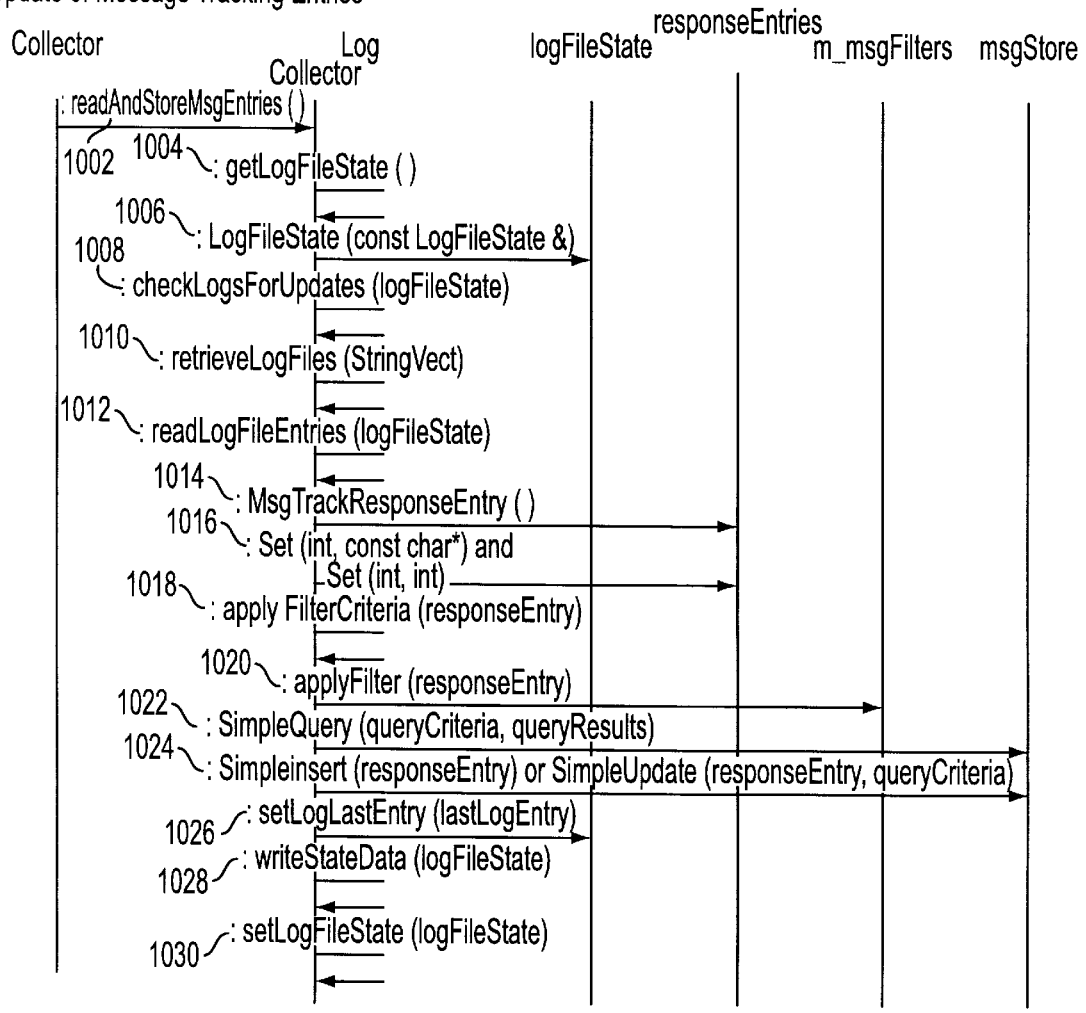
FIG. 10 is an interaction diagram illustrating the steps for updating message tracking entries from message tracking logs.
Figure 11:
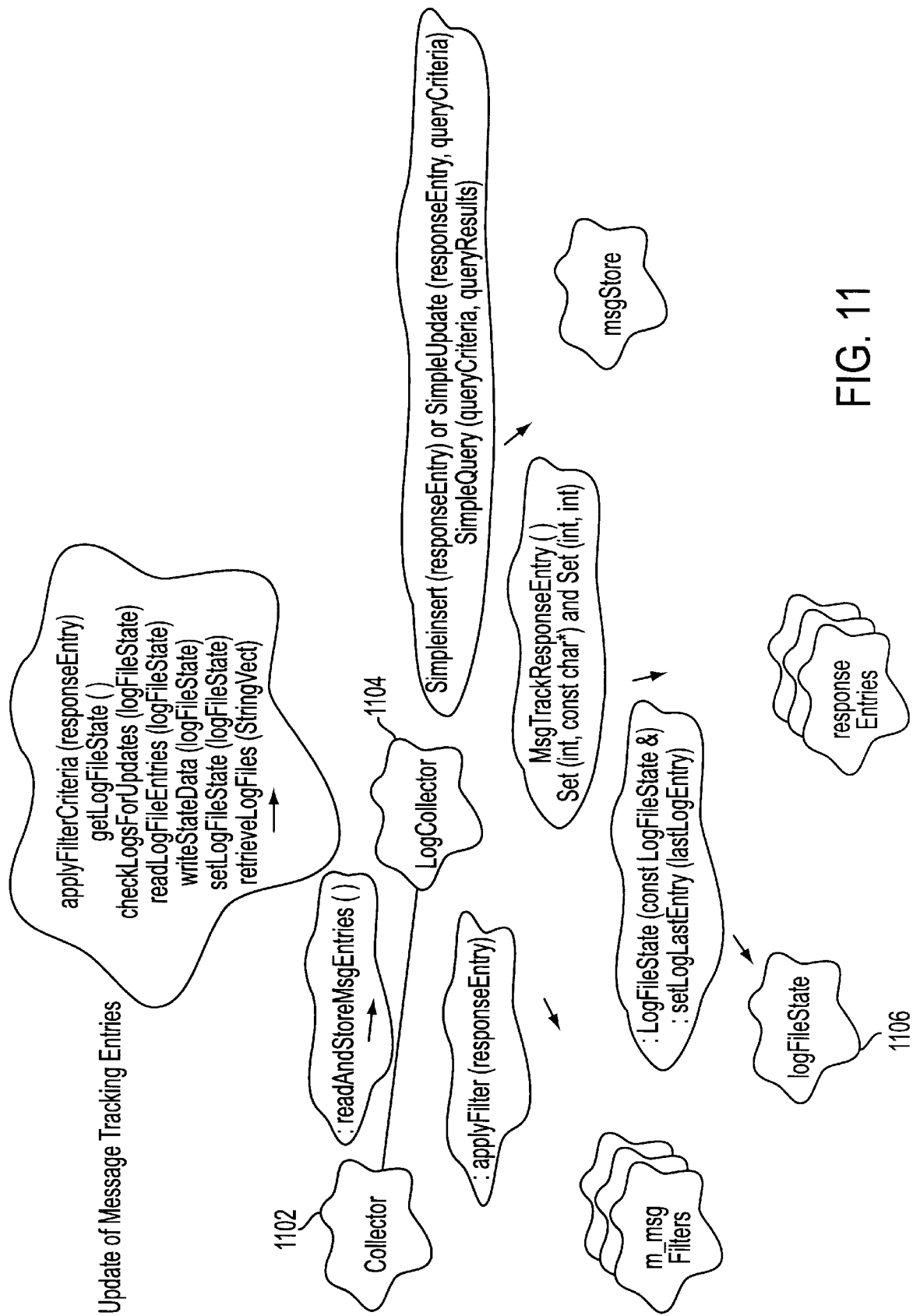
FIG. 11 illustrates the topology of entities involved in updating message tracking entries from message tracking logs.

FIGS. 10 and 11 illustrate the steps for updating message tracking entries from message tracking logs. First, the Collector 1102 process invokes LogCollector method readAndStoreMsgEntries 1002. The LogCollector 1104 then retrieves the state of the current log file by invoking its method getLogFileState 1004. The returned state is held in logFileState 1106. Next, LogCollector 1104 creates anew LogFileState object, logFileState, using currentLogFileState 1006. The logFileState class 1106 holds three member variables: m_logFileName, m_logLastEntry, and m_logLastModifyTime. m_logFileName holds the file name of the last read native log file. m_logLastEntry holds the last entry read from m_logFileName. m_logLastModifyTime holds the last known modified timestamp of m_logFileName.

Next, LogCollector 1104 invokes its checkLogsForUpdates 1008. The LogCollector object type is actually a user derived class of LogFileCollector since LogFileCollector is an abstract class. checkLogsForUpdates is a virtual method of LogFileCollector which the user can override. The user may override checkLogsForUpdates if the default implementation does not meet the specific needs of his platform or messaging server. This method uses information passed in via logFileState to determine if the native log files have been updated since the last time they were checked. This method invokes another virtual method of LogFileCollector, retrieveLogFiles 1010, which populates a string vector with a chronologically ordered list of the current native log files. The user may override retrieveLogFiles if the default implementation does not meet the specific needs of his platform or messaging server. checkLogsForUpdates then determines if there have been native log file updates and if so it returns the log file name and last modify time via the logFileState object.

Assuming that checkLogsForUpdates determines that native log file updates have been made, LogCollector invokes its readLogFileEntries method 1012. The LogCollector object type is actually a user derived class of LogFileCollector since LogFileCollector is an abstract class. readLogFileEntries is a pure virtual method of LogFileCollector. It uses information passed in via the logFileState object to open the appropriate logfile and search for the last entry that was read from this log file, if any. From this point, the method reads each new entry and parses it into a MsgTrackResponseEntry object 1014, 1016. For each MsgTrackResponseEntry, the following is done 1018, 1020, 1022, 1024: First, filtering criteria are applied to the entry via a call to applyFilterCriteria. If the entry passes filtering, the message store is queried to determine if the entry is already present. If the entry is not present, the entry is inserted into the message store. If the entry is present, the entry is updated in the message store.

The log file(s) is read until no more entries are present. Once all entries are read, the logFileState object is updated with the last log entry that was processed 1026. readLogFileEntries then closes the current log file and returns.

The LogCollector 1104 saves the current state data of the native log file to disk by invoking its method writeStateData 1028. The LogCollector then invokes its method setLogFileState 1030, passing it the new log file state, logFileState. This updates the in memory image of the current log file state.

Figure 12:
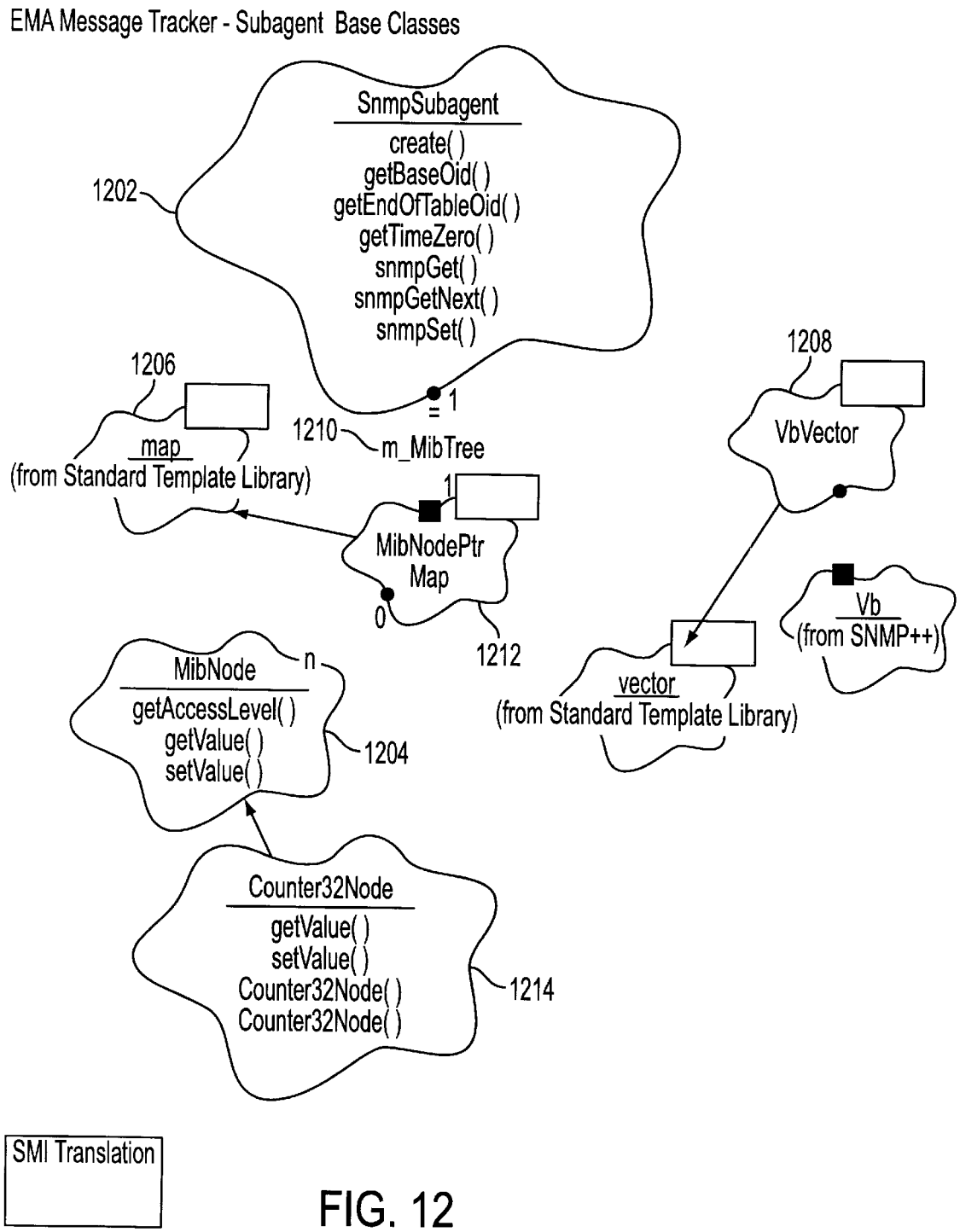
FIG. 12 is a class diagram illustrating the Subagent Base classes of the Message Tracker Subagent.

The Subagent base classes are illustrated in FIG. 12. The Subagent base classes provide the foundation for an SNMP Subagent. SnmpSubagent 1202 is the base class for SNMP subagent. It defines the interface which is exposed to the native SNMP subagent architecture. The SnmpSubagent class 1202 locates Management Information Base (MIB) data using an STL map class 1206 that maps Oid to MibNode 1204. The advantage to this is that any data item in the MIB is located by the STL map class. Typically, no extra coding is necessary for snmpGet or snmpGetNext methods. A client simply has to add MibNode derived classes (with the proper access level) to represent or reference the data in the MIB.

The snmpGet, snmpGetNext, and snmpSetNext all take VbVector types. VbVector 1208 is a vector of Vb, which is the SNMP++ implementation of varbinds. A layer may exist between this class and the native subagent architecture to convert the native Structure of Management Information (SMI) representations to SNMP++ types.

MIB data is referenced by $m_{13}$ MibTree 1210, an STL instantiated map class that maps Oids to MibNodes. An snmpGet or snmpSet operation uses m_MibTree.find(Oid &) to locate an item in the MIB. An snmpGetNext operation is implemented using _MibTree.upper_bound( ) to locate Oid that is lexicographically next relative to the Oid passed in. Derived classes place items into m_MibTree.

Any special processing that needs to happen on an snmpGet or snmpGetNext may be handled by the MibNode derived class that corresponds to the Oid. Users of this class can override snmpSet if it is desired to validate an entire varbind.

MibNodePtrMap 1212 is a class instantiated from the STL map class. It provides the ability to locate MIB data using the Oid passed via an SNMP request. snmpGet and snmpSet use MibNodePtrMap::find(Oid &). snmpGetNext uses MibNodePtrMap::upper_bound(Oid &).

MibNode 1204 provides the interface which SnmpSubagent uses to transfer data between the MIB and varbinds passed in from the native subagent layer. All data is passed in the form of SnmpSyntax derived classes. MibNodes do not necessarily need to store data, but instead can reference data stored in other tables, shared memory, and the like. In other words, getValue and setValue can do anything necessary to retrieve the proper value. The only restriction is the value returned must be an SnmpSyntax derived value.

A MibNode class implemented in this category is the Counter32Node class 1214. Other MibNode classes that contain the SNMP++ basic types are added as needed. Counter32Node 1214 is a MibNode that contains a Counter32value. All setValue calls are validated to make certain that the type passed in is a Counter32.

VbVector 1216 is a STL vector of varbinds. It is created by the Native SNMP Subagent layer and passed to SnmpSubagent via snmpGet, snmpGetNext and snmpSet.

Figure 13:
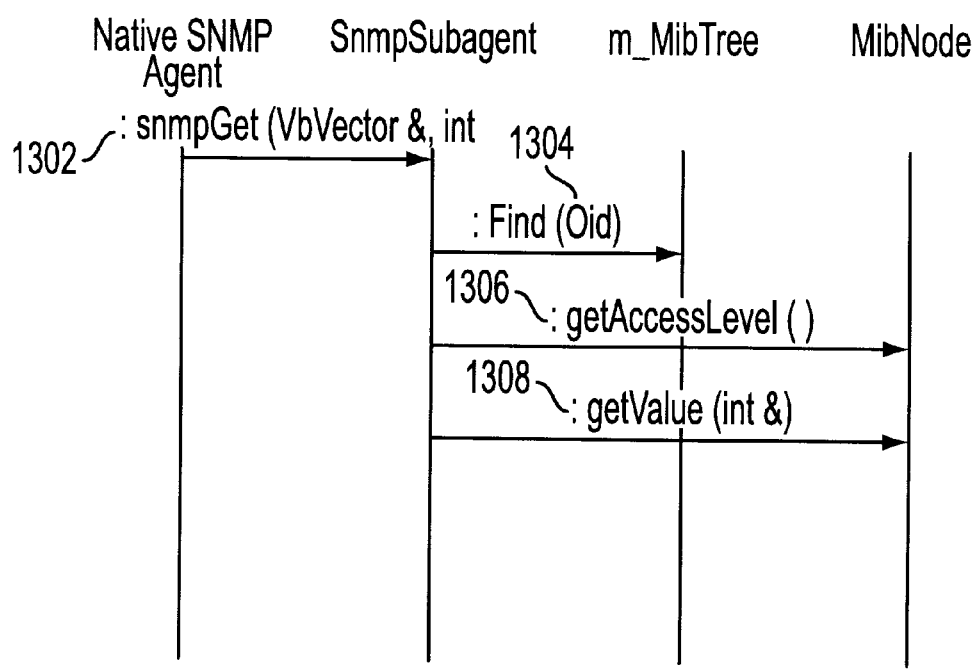
FIG. 13 is an interaction diagram illustrating the steps for the Get operation against a generic MibNode.

FIG. 13 illustrates the Get operation against a generic MibNode. First, the native translation layer invokes the snmpGet method 1302. Next, for each varbind in the VbVector, the Oid to MibNode map is searched for the Oid named in the varbind 1304. Next, the access level of the node is checked to verify that it is sufficient (e.g., read or read-write) 1306. Assuming the access level is sufficient, the virtual getValue method is invoked on the MibNode instance 1308. The MibNode may use whatever means necessary to retrieve the value requested, as long as it is returned as an SnmpSyntax derived value.

Figure 14:
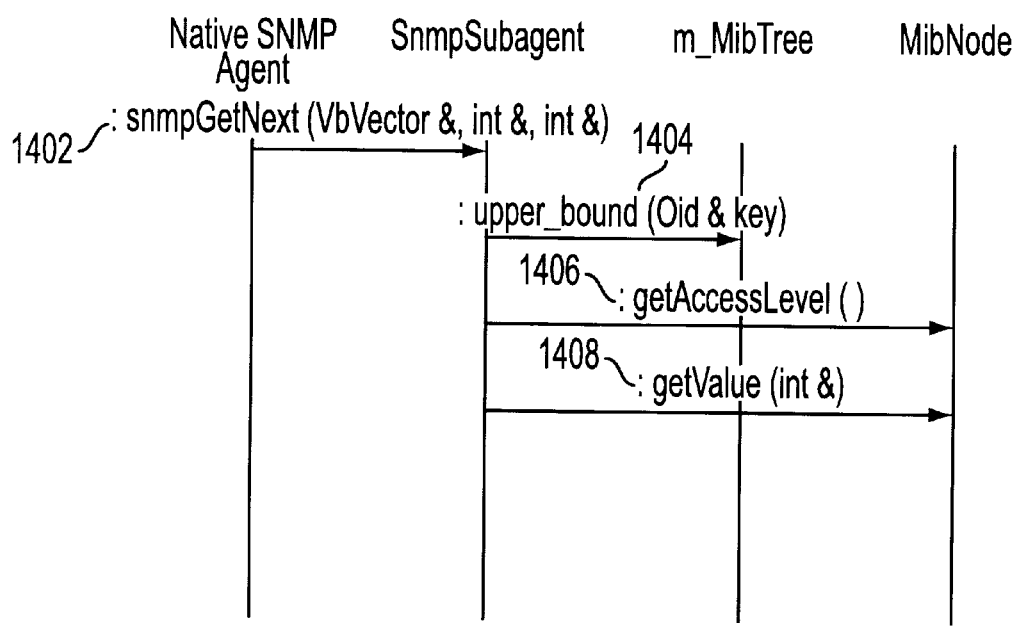
FIG. 14 is an interaction diagram illustrating the steps for the Get Next operation against a generic MibNode.

FIG. 14 illustrates the GetNext operation against a generic MibNode. First, snmpGetNext is invoked by native subagent layer 1402. Next, SnmpSubagent class uses the upper_bound method of the MibNodePtrMap to locate the first node which has an associated Oid larger than "key" 1404. If a node is located, its access level is checked to verify that it is sufficient (e.g., read or read-write) 1406. If the node is not located, key is set to the "end of mib" node and no value is returned in the varbind. If the access level is sufficient, key is updated to match the Oid found and the virtual getValue method of the MibNode class is invoked to retrieve the value 1408. The MibNode may use whatever means necessary to retrieve the value requested, as long as it is returned as an SnmpSyntax derived value.

Figure 15:
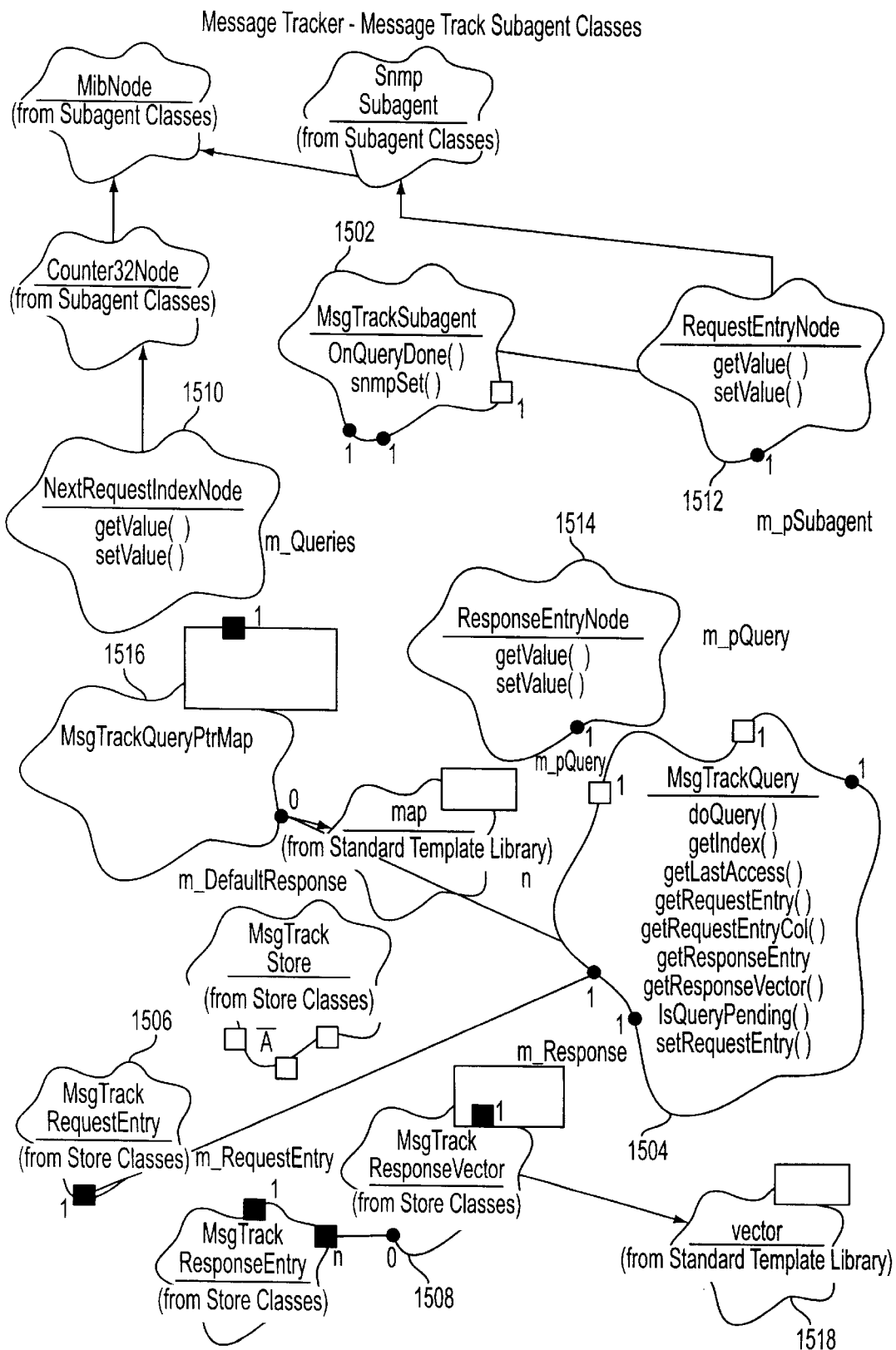
FIG. 15 is a class diagram illustrating the Subagent classes of the Message Tracker Subagent.

FIG. 15 illustrates the Message Tracker Subagent classes. Among other functionalities, the Message Tracker Subagent classes implement conceptual row creation needed to store a message tracking request. This family of classes also maps data stored in RequestEntry and ResponseEntry tables to the base class mib tree where they can be easily accessed by the base class get and getnext functionality.

The MsgTrackSubagent class 1502 populates the base class Mib tree with MibNodes which represent data in the MIB. The setMsgTrackRequestTable and OnQueryDone populate the base class mib tree with references to MsgTrackRequestEntry instances and MsgTrackResponseEntry instances, respectively.

The MsgTrackQuery class 1504 associates a single MsgTrackRequestEntry with its associated MsgTrackResponseTable. There is one MsgTrackQuery for every conceptual request row. MsgTrackQuery executes a query against the message tracker store whenever a MsgTrackRequestEntry is passed to it with the reqRowStatus set to active. The MsgTrackSubagent 1502 is a friend to this class. MsgTrackSubagent 1502 is preferably the only class that can create the MsgTrackQuery class 1504. The default constructor is purposely made private for this reason.

When a query has completed, the MsgTrackQuery class 1504 calls MsgTrackSubagent::OnQueryDone(this). MsgTrackSubagent then adds references to every MsgTrackResponseEntry column.

The time stamp of the latest access of either MsgTrackRequestEntry 1506 or MsgTrackResponseEntry 1508 is recorded. This time value is one of the factors considered during the garbage collection sweep to decide if a particular MsgTrackQuery instance should be discarded.

The NextRequestIndexNode class 1510 is the MibNode which represents the msgTrackNextRequestIndex object type. The getValue method increments the value of this node before returning it. setValue preferably always returns false.

The RequestEntryNode class 1512 represents a request entry in the MIB. Whenever a request entry value is set by MsgTrackSubagent, a corresponding instance of this class is added to the base mib tree. A RequestEntryNode is given two pieces of information that allow it to return the proper value when asked. The first is a pointer to a MsgTrackQuery instance, stored in the pQuery member variable. Since there is a MsgTrackQuery instance for every conceptual request row, pQuery points to the correct row in the set of requests. (Recall that a MsgTrackRequestEntry is contained inside the MsgTrackQuery.) The second piece of information is the column within the MsgTrackRequestEntry to which this node refers. This information is derived from the Oid during snmpSet processing. Whenever the getValue( ) method is invoked, the MsgTrackRequest instance owned by pQuery is referenced. The column that was specified at construction time is used to "get" the correct value.

The ResponseEntryNode class 1514 represents a ResponseEntry in the Mib by providing a reference to a row and column in a table of MsgTrackResponse instances. Instances of ResponseEntryNode are created by MsgTrackSubagent after a MsgTrackQuery finishes a query operation. Since each set of responses is associated with a particular request and therefore a particular MsgTrackQuery instance, this class needs three pieces of information to locate its associated data: a pointer to the MsgTrackQuery instance; the column that contains the desired data; and the row that contains the desired data.

The MsgTrackQueryPtrMap class 1516 is a STL template class that maps unsigned integers (i.e., components that make up Oids in this case) to instances of MsgTrackQuery classes. This is the container of conceptual rows maintained by the subagent. The key of this map is the index used by SNMP management software to reference rows the MsgTrackRequestTable, reqEntryIndex.

The VbVector class 1518 is a STL vector of varbinds. It is created by the Native SNMP Subagent layer and passed to SnmpSubagent via get, getnext, or set.

Figure 16:
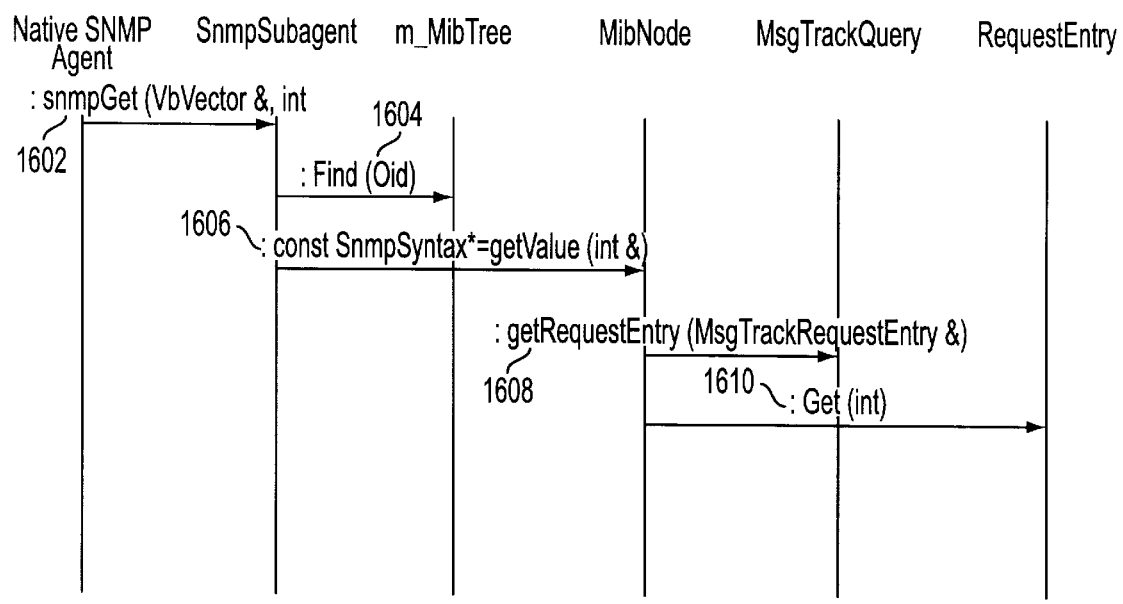
FIG. 16 is an interaction diagram illustrating the steps for the Get operation against msgTrackRequest.reqResponseStatus.

FIG. 16 illustrates the steps of the Get operation against msgTrackRequest.reqResponseStatus. First, native translation layer invokes the snmpGet method 1602. For each varbind in the VbVector, the Oid to MibNode map is searched for the Oid named in the varbind 1604. Assuming a node is found, the virtual getValue method is invoked on the MibNode instance 1606. Assuming that the node found is an instance of MsgTrackRequestNode, there is a MsgTrackQuery instance associated with this node 1608. getValue is then coded to retrieve a value from the column that corresponds to the Oid used to find the node 1610.

Figure 17:
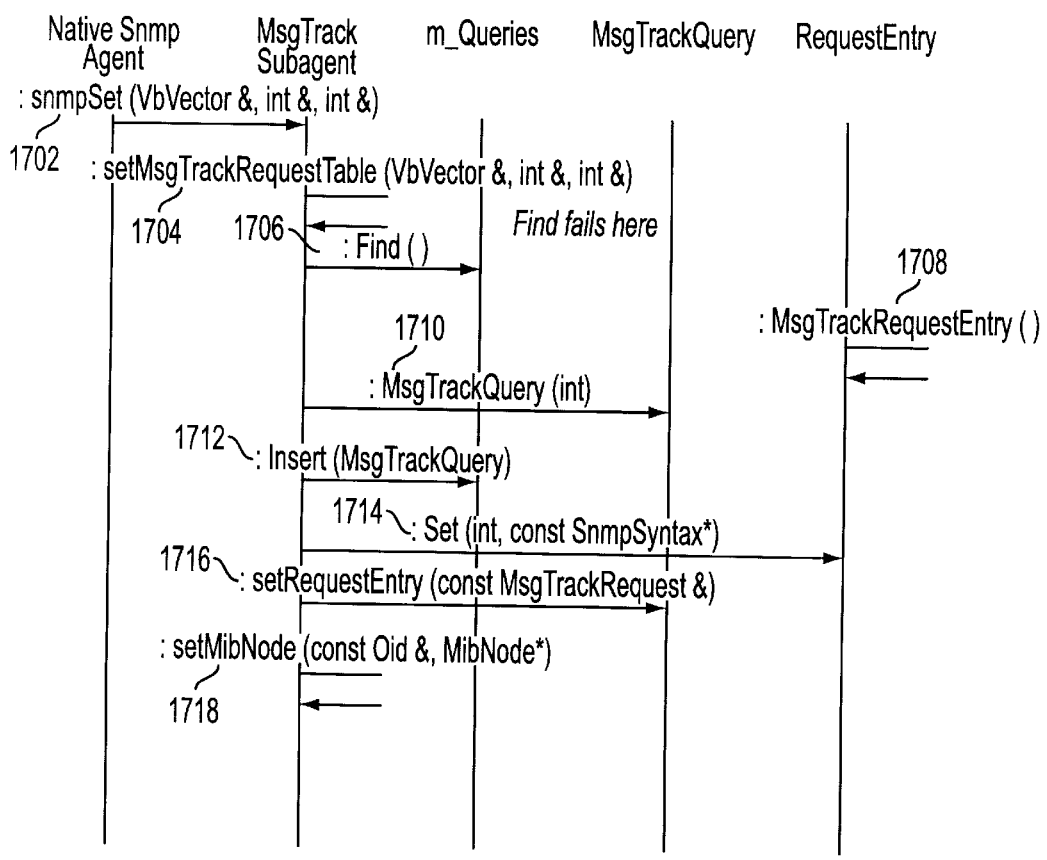
FIG. 17 is an interaction diagram illustrating the steps for the Set operation creating a conceptual row.

FIG. 17 illustrates the Set operation for creating a conceptual row. The snmpSet operation of SnmpSubagent is overridden because the base functionality for setting values is not sufficient for conceptual row creation. First, Set operation is received from Native Subagent 1702. Since preferably only the MsgTrackRequestTable contains writeable objects, it is assumed that all varbinds are intended for the MsgTrackRequestTable. Next, setMsgTrackRequest encapsulates the entire set operation 1704. Next, the MsgTrackQuery instance that corresponds to the index in the first Oid of the first varbind is found 1706. In the case illustrated in FIG. 17, the index is not found. The varbind is then examined for a reqRowStatus=createAndWait or reqRowStatus=createAndGo. If neither of these status values are found, SNMP_CLASS_NO_SUCH_NAME is returned. Assuming one of these status values is found, a MsgTrackRequestEntry 1708 and a MsgTrackQuery 1710 is constructed and added to the set of Queries 1712. The int parameter of the MsgTrackQuery constructor corresponds to the msgTrackNextRequest Index that the manager received from this agent. The reqRowStatus value and others if present are added to the MsgTrackRequestEntry 1714. The MsgTrackRequestEntry is then added to the MsgTrackQuery 1716. For each value added to the MsgTrackRequestEntry, a RequestEntryMibNode that references its corresponding column is added to the base class mib tree so that the base class snmpGet and snmpGetNext methods can return values for these items 1718.

Figure 18:
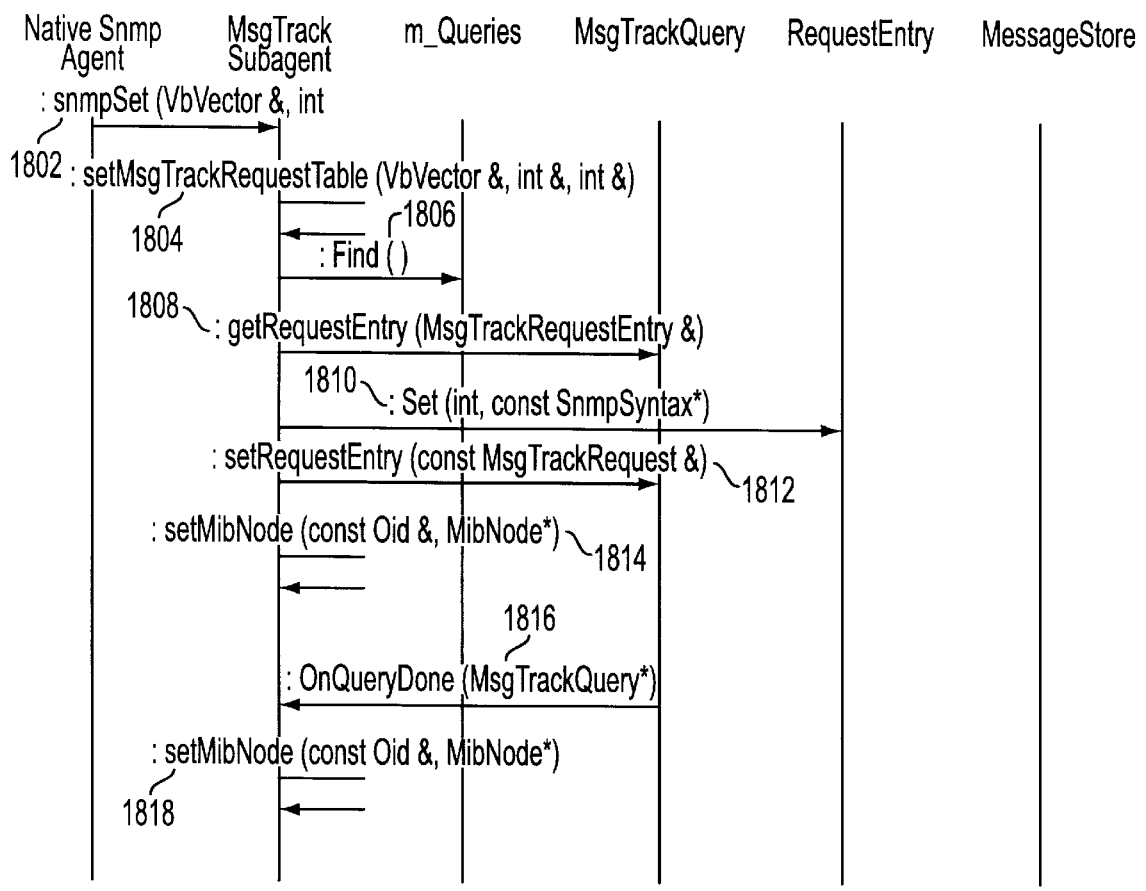
FIG. 18 is an interaction diagram illustrating the steps for the Set operation where reqRowStatus is set to active.

FIG. 18 illustrates the Set operation where reqRowStatus is set to active. The snmpSet operation of SnmpSubagent is overridden because the base functionality for setting values is not sufficient for conceptual row creation. First, the native subagent layer invokes snmpSet 1802. Next, the MsgTrackSubagent calls setMsgTrackRequest 1804. setMsgTrackRequest encapsulates the entire set operation. Next, the MsgTrackQuery agent that corresponds to the index in the first Oid of the first varbind is found 1806. If the index is not found, the varbind is examined for a reqRowStatus=createAndWait or reqRowStatus=createAndGo. If found, a MsgTrackQuery is added to the set of request agents, otherwise SNMP_CLASS_NO_SUCH_NAME is returned. A copy of the MsgTrackRequestEntry owned by MsgTrackQuery is retrieved 1808. All varbinds are applied to the MsgTrackRequestEntry with validation 1810. RequestEntry is then reset to MsgTrackQuery 1812. RequestAgent determines that reqRowStatus has been set to active and starts a thread to Query MessageStore. For each value that was added to the MsgTrackRequestEntry, a RequestEntryMibNode is constructed and added to the mib tree of the base class 1814. Note that these nodes REFERENCE the values in the MsgTrackRequestEntry so that changes to the MsgTrackRequestEntry values will automatically be reflected in the mib. When the query has completed, the MsgTrackQuery instance calls the OnQueryDone method of MsgTrackSubagent 1816. For each column of every response row, a MsgTrackResponseEntry is constructed and added to the mib tree of the base class 1818. These nodes REFERENCE items in the vector of responses owned by the MsgTrackQuery.

A preferred embodiment of the invention responds to message tracking queries even if the message identifier is not supplied. Users can track down the location and path history of an individual message based on a query providing general descriptive information about the message. A query may also be generated to determine if one or more message paths are operating properly. Moreover, queries may seek tracking information about a message, from its entry into a messaging system until it is delivered, non-delivered, or passes outside the management sphere into another management sphere. If the message passes into another management sphere, the message tracking query can be passed to the appropriate authority in the next management sphere so that the track can be continued there. The message tracking system accesses and manages messaging data across multiprotocol environments.

Another embodiment of the invention provides a front end which allows users to readily query the message tracking system for messaging information. The user interface allows the user to access the message tracking system via an internal or external network. For example, the front end may be platform-independent and provide access over the World Wide Web ("Web"). The Web site may be within an enterprise intranet, on the Internet, or both. The front end may also be in the form of e-mail or other similar messaging interface.

Access to information via the front end may be depend on the identity of the user, identity of the recipient, location of the user and other configurable factors. For example, users accessing the system from a corporate intranet may be provided with certain information that users accessing the system from the Internet should not be provided.

Other embodiments and uses of the invention will be apparent to those skilled in the art from consideration of the specification and practice of the invention disclosed herein. The specification should be considered exemplary only, with the true scope and spirit of the invention indicated by the following claims.

We claim:

1. A method for tracking electronic messages, comprising the steps of:
   enabling a collector to collect a plurality of tracking entries, wherein said tracking entries comprise messaging data, and said messaging data further comprise at least one of: data from a native message log and data from a native application program interface;
   enabling said collector to insert said tracking entries into a message tracker store;
   storing said tracking entries in said message tracker store;
   updating said message tracker store at a predetermined interval, wherein said step of updating comprises enabling said collector to collect additional tracking entries, and enabling said collector to insert said additional tracking entries into said message tracker store; and
   enabling a subagent to receive a tracking entry query said tracking entry query comprising:
   a tracking entry query conceptual row,
   a tracking store object call,
   a fill row object that fills said tracking entry query conceptual row with response objects, and
   an assembler to assemble a formatted response.

2. A method for tracking electronic messages according to claim 1, wherein said tracking entries comprise messaging data from a plurality of messaging systems.

3. A method for tracking electronic messages according to claim 1, wherein said messaging data are retrieved via Simple Network Management Protocol.

4. A method for tracking electronic messages, comprising the steps of:
   reading native message log files;
   extracting a plurality of native message tracking entries from said native message log files, said native message tracking entries being in native format;
   converting said native message tracking entries into message track store entries, said message track store entries being in a message store format;
   filtering said message track store entries to produce filtered message track store entries;
   storing said filtered message track store entries in a message tracker store; and
   updating said message tracker store, wherein said step of updating comprises:

checking said native message log files for new entries, said new entries being entries that have been added to said native message log files subsequent to execution of said reading step;

filtering said new entries to produce filtered new entries;

querying said message tracker store to determine if each of said filtered new entries is present in said message tracker store;

inserting each said filtered new entry into said message tracker store for each said new entry that is not present in said message tracker store; and updating corresponding entries in said message tracker store for each said new entry that is present in said message tracker store; and retrieving messaging data from said message tracker store wherein said step of retrieving messaging data comprises:

enabling a subagent to receive a tracking request, said tracking request comprising:
a tracking request conceptual row,
a tracking store object call,
a fill row object that fills said tracking request conceptual row with response objects, and
an assembler to assemble a formatted response.

5. A method for tracking electronic messages according to claim 4, wherein said checking step is conducted at a predetermined interval.

6. A method for tracking electronic messages according to claim 4, wherein said tracking request is inputted by a user via a user interface.

7. A method for tracking electronic messages according to claim 4, wherein said tracking request comprises general query information.

8. A method for tracking electronic messages according to claim 6, further comprising means for providing said tracking responses to said user.

9. A message tracking system, comprising:

a message tracker store having a plurality of tracking entries, wherein said tracking entries comprise messaging data, and said messaging data further comprise at least one of: data from a native message log and data from a native application program interface;

a collector, wherein said collector reads said messaging data and inserts tracking entries into said message tracker store; and a subagent, wherein said subagent enables a tracking request, said tracking request comprising:
a tracking request conceptual row,
a tracking store object call,
a fill row object that fills said tracking request conceptual row with response objects, and
an assembler to assemble a formatted response.

10. A message tracking system according to claim 9, further comprising a user interface, said user interface being linked to said subagent to allow a user to retrieve said tracking entries.

11. A message tracking system according to claim 10, wherein said user interface is a World Wide Web browser.

12. An electronic message tracking system comprising:

message tracker store means for storing a plurality of entry tracking means;

collector means for inserting said entry tracking means into said message tracker store means; and subagent means wherein said subagent means enables a tracking request, said tracking request comprising:
tracking request conceptual row means,
tracking store object call means,
fill row object means that fills said tracking request conceptual row means with response objects, and
assembler means to assemble a formatted response.

13. The electronic message tracking system of claim 12, further comprising:

user interface means for linking to said subagent means to allow a user to retrieve said entry tracking means.

14. An electronic storage medium having code embodied thereon for causing a processor to track electronic messages, the medium comprising:

message tracker store code that enables a message tracker store that stores at least one tracking entry;

collector code that inserts the at least one tracking entry into the message tracker store; and subagent code that enables a tracking request, said tracking request comprising:
a tracking request conceptual row,
a tracking store object call,
a fill row object that fills said tracking request conceptual row with response objects, and
an assembler to assemble a formatted response.

15. The electronic storage medium of claim 14, further comprising:

user interface code that enables a user interface that links to the subagent to allow a user to retrieve the at least one tracking entry.

* * * * *